United States Patent [19]

Schlameus et al.

[11] Patent Number: 5,254,598
[45] Date of Patent: Oct. 19, 1993

[54] BIODEGRADABLE COMPOSITION AND PRODUCTS

[75] Inventors: Herman W. Schlameus; Mary C. Marshall; Stephen T. Wellinghoff; Donald J. Mangold; James R. Scott, all of San Antonio, Tex.

[73] Assignee: Southwest Research Institute, San Antonio, Tex.

[21] Appl. No.: 804,291

[22] Filed: Dec. 9, 1991

[51] Int. Cl.$^5$ .............................. C08J 9/36; C08J 3/32; B32B 3/26; C08K 7/02
[52] U.S. Cl. .................................. 521/54; 428/321.5; 428/402.2; 523/222; 524/423
[58] Field of Search .......................... 521/54; 524/423; 523/222; 428/402.2, 321.5

[56] References Cited

U.S. PATENT DOCUMENTS

| | | | |
|---|---|---|---|
| 3,954,686 | 5/1976 | Lagally | 525/455 |
| 4,148,781 | 4/1979 | Narukawa et al. | 524/423 |
| 4,568,603 | 2/1986 | Oldham | 428/195 |

Primary Examiner—John Kight, III
Assistant Examiner—T. Mosley

[57] ABSTRACT

A biodegradable composition comprising a polymer matrix having distributed substantially uniformly therethrough hollow sphere-like inclusions or microcapsules, said polymer matrix consisting essentially of a water-soluble polymer/polymer-compatible salt complex with said salt present in an amount sufficient to render said polymer insoluble in water and products made by shaping such composition.

7 Claims, 1 Drawing Sheet

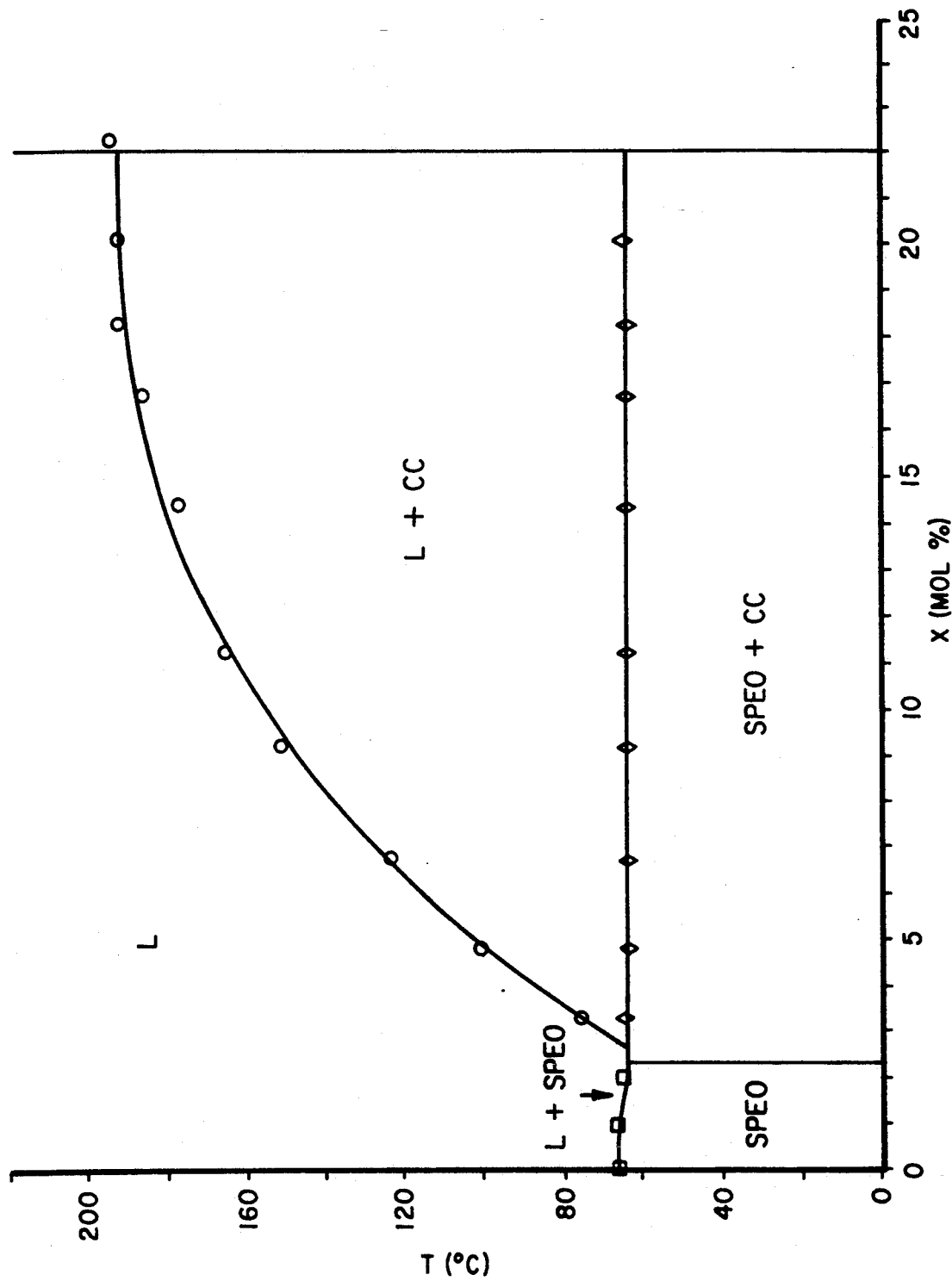

BIODEGRADABLE COMPOSITION AND PRODUCTS

BACKGROUND OF THE INVENTION

The present invention relates to biodegradable compositions which can be utilized to prepare foam containers, protective wrap, packaging materials and the like.

At the present time polymers such a polystyrene which do not readily degrade in the environment are utilized to make foam containers, protective wraps, packaging materials such as films and "peanuts", which containers, films and the like are used in making disposable cups, containers for fast-food articles and the like. Because of their failure to degrade they have an adverse environmental impact on land fills, from littering in waterways, etc. There has been increased public concern about the utilization thereof to the point where many companies have now decided to stop using the polystyrene materials and to use as alternatives materials made from paper including those utilizing either plastic or wax coated paper. However, it has been found that such paper articles are in many cases even more unsatisfactory in that the processing thereof requires even more plastic to coat the paper and materials are used in the process thereof which are even more detrimental to the environment.

Efforts to make foamed plastic materials that are less adverse to the environment and make them biodegradable have not been successful. Those efforts have included adding other materials to them to make them more susceptible to degradation based on ambient environmental conditions, such as susceptibility to water, sunlight and/or oxygen attack.

SUMMARY OF THE INVENTION

The present invention overcomes the problems of the prior art to form readily biodegradable compositions and articles particularly those that are hydrolytically degradable.

Briefly, the present invention comprises a biodegradable composition comprising a polymer matrix having hollow sphere-like inclusions or microcapsules distributed substantially uniformily therethrough, said polymer matrix consisting essentially of a water-soluble polymer/polymer-compatible salt system, wherein said salt is present in an amount sufficient to achieve the eutectic point of the mixture of said polymer and said salt.

The invention also comprises articles formed from such compositions such as containers, plastic wrap, protective wrap, packing materials and the like as described in detail below.

BRIEF DESCRIPTION OF THE DRAWING

The sole FIGURE of the drawing is a binary phase diagram of an example of a water-soluble polymer/salt system of the present invention.

DETAILED DESCRIPTION

The essential components of the present invention are the water-soluble polymer having suitable softening temperature, the salt that is compatible therewith, and the sphere-like inclusions or microcapsules.

With respect to the water-soluble polymers, these are preferably a polyethylene oxide although other water-soluble polymers such as polyvinyl alcohol can be used. It is only necessary that the water-soluble polymer selected be one that can be complexed with a salt to insolubilize the same. The polyethylene oxide polymers are preferred since they soften at low temperatures, about 60° C.-65° C., and thus can be processed at such low temperatures into the desired final product(s).

As to the salt, it must be, as noted one compatible with the polymer and capable of achieving a eutectic point when admixed therewith, (rendering the polymer insoluble in water, except upon prolonged exposure to water) preferably at very low percentage concentrations of the salt. The particular salt utilized will vary dependent upon the polymer and by way of illustration, for polyethylene oxide it is preferred to use sodium chloride or sodium thiocyanate although other alkali and other alkaline earth salts of phosphates, carbonates, silicates, sulfates, chlorides or organic and inorganic amines such as tetraethyl to tetraoctyl can also be utilized.

As to proportions, as noted it is important to utilize the salts that can be added thereto at the lowest level to reach the eutectic point, normally about 3 to 10 percent by weight of the polymer. The amount required for any given polymer-salt combination can be readily determined by routine experimentation with the amount of salt added being that sufficient to prevent immediate dissolution of the polymer in water. Over time the complex will dissolve in water.

Other materials that can be utilized in the composition are materials that are optionally added to plastics used for containers such as plasticizers to make them more flexible, colorants, or fillers. Suitable plasticizers for polyethylene oxide are lower molecular weight polyethylene glycols. For other water-soluble polymers, plasticizers normally used therewith can be utilized.

In order to give strength and foam-like properties (such as a light weight) to the composition hollow spheres are added. These can be made of a resin, such as phenolic resin spheres, ceramics, glass or other suitable rigid material. These hollow spheres act to strengthen the articles made from the composition and are preferably microspheres having a diameter of about 0.0002 to 0.006 inches.

Also, in those instances where it is desired to use this composition as a container for hot liquids such as coffee and the like it is necessary to add certain polyelectrolytes in order to permit the resultant article to maintain its shape, strength and not to be readily dissolved. For this purpose and in the case of polyethylene oxide it is preferred to add a polyelectrolyte such as any polyacrylate to minimize the fusion into the surrounding phase. It is know that polyethylene oxide forms a complex with sodium acrylate, for example.

In those instances where high strength is not required, the hollow microspheres can be dispensed with and the plastic foamed directly utilizing the usual foaming agents for that purpose. By way of example, either nitrogen or carbon dioxide could be dissolved into the polymer liquid at high pressure and upon injection of the polymer/salt mixture into a mold and release of the pressure, foaming will occur. The resultant bubble walls become stabilized during foaming when the temperature and the pressure is close enough to the liquidus line so that stretch crystallization of the expanding bubble walls into the crystalline complex phase of the polymer takes place.

Alternatively, in place of the microspheres it is possible to utilize microcapsules to form self-disintegrating materials. The microcapsules can be made of materials which are activated by environmental conditions, such as time, pressure, temperature, sunlight or water to release the material therein to initiate the decomposition. Examples of such microcapsules and ingredients contained therein are unsaturated fats or $TiO_2$ (anatase form) encapsulated in water-soluble polymers such as polyvinyl alcohol, starch or methylcellulose.

It will be evident that products made from the composition can be treated as other foam materials, and if desired, to give them protection against moisture in use can be coated with a thin film of wax, polyethylene or lipid material.

Of all of the polymeric materials it is preferred to utilize a polyethylene oxide since it is a food grade component that is hydrolytically degradable. As a consequence its use should not result in any residual harm to the environment should it become dissolved into natural water sources such as streams, lakes and ground water.

The invention will be further described in connection with the following examples which are set forth for purposes of illustration only.

EXAMPLE 1

A mixture is formed of three parts by weight of a polyethylene oxide/sodium chloride (about 5% of chloride based on polymer weight), one part by weight phenolic microspheres having a diameter of about 0.002 to 0.0005 inches, one part by weight calcium carbonate and two parts by weight propylene glycol. The components were blended and heated to 100° C. in a circular mold and compressed at about 5000 PSI to form foam-like disks.

The disks were tested and showed an apparent strength equal to or greater than polystyrene foam prepared in a conventional manner. When placed in water the disks disintegrated over time.

EXAMPLE 2

The procedure of Example 1 is followed except that no calcium carbonate was utilized and the proportions in parts by weight, were two parts polyethylene oxide/sodium chloride, one part phenolic microspheres and 0.5 proplyene glycol. In this case suitable foam-like disks were prepared and they disintegrated in water over time.

EXAMPLE 3

The procedure of Example 1 was followed except that the proportions of the components was varied so that there were three parts by weight polyethylene oxide/sodium chloride, two parts by weight glass microballoons (about 0.0006–0.003 inches in diameter) and one part by weight propylene glycol and equally strong foam-like disks were prepared. The disks disintegrated in water.

The compositions of the present invention can be formed into containers and sheeting in the same manner as conventional foaming compositions. They can be molded or extruded using apparatus conventionally used with other foaming compositions to form cups, bowls, and the like containers or sheeting such as protective wrap and packaging materials. The resultant products are degradable under ambient environmental conditions.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A biodegradable composition comprising a polymer matrix having distributed substantially uniformly therethrough hollow sphere-like inclusions or microcapsules, said polymer matrix consisting essentially of a water-soluble polymer/polymer-compatible salt system with said salt present in an amount sufficient to achieve the eutectic point of the mixture of said polymer and said salt to prevent the immediate dissolution of said polymer in water, but dissoluble in water over time.

2. The composition of claim 1 wherein the water-soluble polymer is a polyethylene oxide and hollow sphere-like inclusions are used.

3. The composition of claim 2 wherein said inclusions are made of phenolic resin.

4. The composition of claim 1 wherein the water-soluble polymer is a polyethylene oxide, said salt is an alkali or alkaline earth metal chloride, and said chloride is used in an amount of about 3 to 10% by weight of said polymer, required to achieve the eutectic point of the mixture of said polymer and said salt.

5. The composition of claim 4 wherein said inclusions are made of a phenolic resin having a diameter of about 0.0002 to 0.006 inches.

6. The composition of claim 4 wherein said microcapsules are made of materials which are activated by ambient environmental conditions to initiate decomposition of said composition.

7. A product degradable by environmental conditions formed by shaping the composition of any one of claims 1 to 6.

* * * * *